(12) United States Patent
Le Gonidec et al.

(10) Patent No.: US 8,886,582 B2
(45) Date of Patent: Nov. 11, 2014

(54) FAILURE DETECTION AND LOCATING SYSTEM AND ENGINE CONTAINING THE SAME

(75) Inventors: Serge Le Gonidec, Vernon (FR); Pierre Bornert, Vernon (FR); Alban Lemaitre, Vernon (FR)

(73) Assignee: SNECMA, Paris (FR)

( * ) Notice: Subject to any disclaimer, the term of this patent is extended or adjusted under 35 U.S.C. 154(b) by 281 days.

(21) Appl. No.: 13/581,076

(22) PCT Filed: Feb. 17, 2011

(86) PCT No.: PCT/FR2011/050334
§ 371 (c)(1),
(2), (4) Date: Oct. 4, 2012

(87) PCT Pub. No.: WO2011/104466
PCT Pub. Date: Sep. 1, 2011

(65) Prior Publication Data
US 2013/0046713 A1    Feb. 21, 2013

(30) Foreign Application Priority Data
Feb. 24, 2010   (FR) ...................................... 10 51322

(51) Int. Cl.
*G06F 11/00*     (2006.01)
*F02K 9/96*      (2006.01)
*G05B 23/02*     (2006.01)

(52) U.S. Cl.
CPC ........ *G05B 23/0278* (2013.01); *F05D 2260/80* (2013.01); *F05D 2270/09* (2013.01); *F02K 9/96* (2013.01); *F05D 2260/96* (2013.01)
USPC ............................................ 706/45; 714/100

(58) Field of Classification Search
None
See application file for complete search history.

(56) References Cited

U.S. PATENT DOCUMENTS

| | | | |
|---|---|---|---|
| 4,644,479 A |  | 2/1987 | Kemper et al. |
| 4,977,395 A |  | 12/1990 | Bozeman, Jr. |
| 5,132,920 A |  | 7/1992 | Bellows et al. |
| 5,710,723 A | * | 1/1998 | Hoth et al. .................... 702/181 |
| 2007/0028220 A1 | * | 2/2007 | Miller et al. .................. 717/124 |

OTHER PUBLICATIONS

International Serch Report Filed May 11, 2011 in PCT/FR11/050334 Filed Feb. 17, 2011.

* cited by examiner

*Primary Examiner* — Alan Chen
(74) *Attorney, Agent, or Firm* — Oblon, Spivak, McClelland, Maier & Neustadt, L.L.P.

(57) ABSTRACT

A system for detecting and locating failures that occur in a complex system includes elements (CAP, $MOD_{VAL}$, $MOD_{DP}$, $MOD_{FD}$) for detecting and locating a failure affecting at least one sub-system of the complex system. The system also includes an element ($MOD_{PD}$) for making a decision on any action to be taken in the event of such detection. A rocket engine can be monitored with this system.

8 Claims, 6 Drawing Sheets

FAILURE DETECTION AND LOCATING SYSTEM AND ENGINE CONTAINING THE SAME

The invention lies in the field of failure detection.

It more particularly concerns a system capable of diagnosing a failure in a complex system and of taking a suitable step in relation to this diagnosis.

The invention can be used for example to monitor a complex system such as a rocket engine when it is being developed on a test installation.

In the current state of the art, it is usual to monitor a complex system by monitoring the functioning of a plurality of components of this system taken individually, and to take a decision e.g. stopping of the system, when a certain number of components are deemed to have a fault. These techniques use a so-called <<majority voting system>> or <<voting logic>> approach.

The voting logic approach can be perfected for the monitoring of highly complex systems in which malfunctions of very different types regarding either their cause or their level of seriousness are likely to occur.

SUBJECT AND SUMMARY OF THE INVENTION

The invention proposes a system for detecting and locating failures in a complex system, comprising:
  at least one sensor for delivering a signal representing the functioning of a component of the said complex system;
  at least one module for validating the proper functioning of this sensor capable of analysing this signal and of delivering:
    at least one validated signal associated with a so-called <<first order>> confidence level; or
    a message representing a failure of at least one sensor;
  a failure detection module capable of detecting a failure affecting at least one sub-system or component from the validated signal and, if this is the case, of generating at least one raw failure message comprising raw information on the failure and a so-called <<second order>> confidence level;
  a data merging module which, at least from one raw failure message or from the message representing a sensor failure, is capable of generating a consolidated failure message comprising consolidated information on a failure affecting at least one sub-system of the complex system and a so-called <<third order>> confidence level; and
  a decision-making module capable of obtaining the said consolidated failure message and of deciding on at least one action to be taken in relation to :
    the consolidated information on a failure;
    the said third order confidence level; and
    a level of seriousness of the said failure.

Contrary to majority voting systems, the data merging module of the system according to the invention combines the raw failure messages together taking into account the <<confidence level>> parameters.

The raw failure messages associated with their own confidence levels that are input into the data merging module derive from the different failure detection modules associated with different components, sub-systems or the system as a whole.

The system of the invention is therefore advantageously capable of determining a precise diagnosis of the failure by combining and fine-tuning the data derived from the different sensors or failure detection modules, for confirmation, invalidation or moderation thereof via a data merging operation.

Contrary to majority voting systems, the system for detecting and locating failures according to the invention is able to adapt the action to be taken in relation to the seriousness of the failure and the reliability of knowledge of the failure.

In one particular embodiment, the decision-taking module of the failure detecting and locating system of the invention comprises means for obtaining the level of seriousness and identifying the action to be taken, this action being stored in memory in a database.

This database may be formed for example by a database derived from failure mode, effects and critical analysis (FMECA).

The action to be taken in the event of detection of a failure may consist of stopping the complex system or of acting on one or more of the components thereof, these being determined in relation to the failure, and more particularly may entail de-activating, activating or re-activating a component, modifying its operating point or sending a request to a regulating system.

The action to be taken may also consist of waiting for at least one other consolidated failure message emitted by the data merging module to confirm whether an action should or should not be taken.

This characteristic advantageously allows a reduction in the number of undue stoppages and action only to be taken when the confidence level of the failure is sufficient, the character of sufficiency being considered in relation to the level of seriousness of the failure.

In one embodiment, the decision-making module of the failure detection system of the invention uses a fuzzy logic technique. With this characteristic it is advantageously possible to introduce the notion of doubt and indecision as to the action to be taken.

Fuzzy logic techniques are generally used in applications of target-identification type or sensor selection type; but it is noteworthy that the use of fuzzy logic leading to a decision entailing physical action on a component of a complex system, this decision taking into account an index of confidence regarding a failure and its criticality, is not known in the state of the art.

The invention also concerns a rocket engine comprising a failure detection system such as mentioned above.

The invention is of particular interest in the development of a rocket engine on a test installation, in that it allows:
  a reduction in the number of undue stoppages of tests, and action to be taken in relation to the pair: failure seriousness/reliability level of knowledge of the failure;
  action to be taken in relation to the type of failure;
  waiting for confirmation of the failure, if needed, before taking action;
  easy scalability using detection modules defined modular fashion in relation to the architecture of an engine; and
  consideration to be given to the notion of doubt as to the action to be taken.

BRIEF DESCRIPTION OF THE DRAWINGS

Other characteristics and advantages of the present invention will become apparent from the description given below with reference to the appended drawings which illustrate one embodiment thereof that is in no way limiting. In the Figures.

DETAILED DESCRIPTION OF EMBODIMENTS OF THE INVENTION

Figures 1, 2, 3, 8:
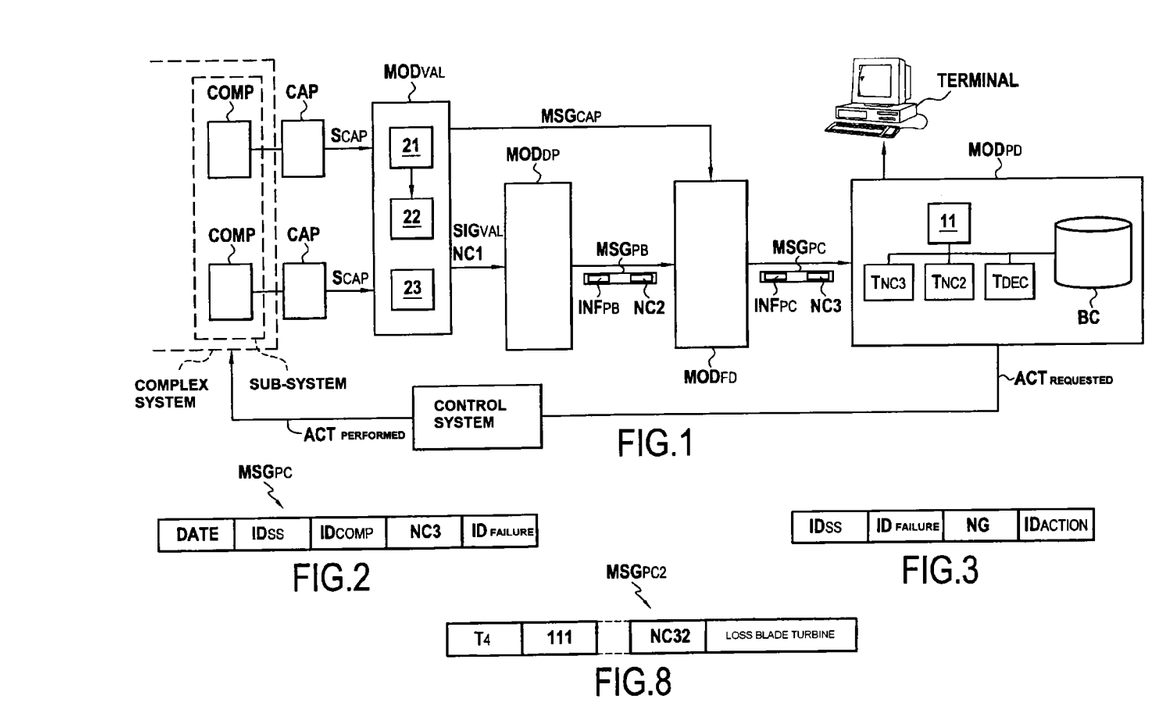
FIG. 1 illustrates the general architecture of a failure detection system conforming to one particular embodiment of the invention.
FIG. 2 illustrates an example of a consolidated failure message which can be used in a failure detection system conforming to the invention.
FIG. 3 shows the recording of a database which can be used in a failure detection system conforming to the invention.
FIG. 8 shows a consolidated failure message generated by a data merging module of the engine in FIG. 4.

FIG. 1 illustrates a failure detection system conforming to one particular embodiment of the invention.

This system allows the detection of failures of a complex system comprising one or more sub-systems, each of these sub-systems comprising one or more components.

The failure detection system according to the invention comprises a certain number of sensors CAP each of these sensors being capable of delivering a signal $S_{CAP}$ representing the functioning of at least one component COMP of the complex system.

In the example shown FIG. 1, two components COMP are illustrated, each one associated with a sensor CAP capable of delivering a signal $S_{CAP}$ representing a component with which it is associated.

The signals $S_{CAP}$ delivered by the sensors CAP may be low frequency signals for example; this is notably the case when these sensors measure movement, a flow rate, pressure, temperature or velocity.

The signals $S_{CAP}$ may also be high frequency signals, in particular when the sensors with which they are associated measure vibrations or pressures likely to undergo rapid variations.

The detection system of the invention comprises a validation module $MOD_{VAL}$ capable of validating the proper functioning of each of the sensors CAP.

In the example of embodiment described here, the validation module $MOD_{VAL}$ comprises:

a reference model 21;
a bias detection module 22; and
a noise detection module 23.

In the embodiment described here the validation module $MOD_{VAL}$ detects failures affecting the sensors CAP delivering low frequency signals:

either by detecting a bias in the signal $S_{CAP}$ using redundancies of this signal and/or outputs of the reference model 21;

or by detecting noises in the signal $S_{CAP}$, zero noise indicating a sensor CAP out of service and excessive noise indicating a problem of electrical nature.

In the embodiment described here, the validation module $MOD_{VAL}$ detects failures affecting the sensors delivering high frequency signals $S_{CAP}$ by detecting non-symmetry in this signal.

According to the invention, the validation module $MOD_{VAL}$, for each measurement, delivers a validated signal $SIG_{VAL}$ associated with a first order confidence level NC1 if the sensor is operational, or a message $MSG_{CAP}$ representing a sensor failure.

The messages $MSG_{CAP}$ representing a sensor failure are transmitted to a data merging module $MOD_{FD}$ of which a description will be given later.

The validated signals $SIG_{VAL}$ and the first order confidence levels NC1 associated therewith are transmitted to a failure detection module $MOD_{DP}$.

The failure detection module $MOD_{DP}$ is capable of detecting failures affecting a component, the complex system as a whole or a sub-system of this complex system.

The algorithms used for failure detection can be of various types and may in particular make use of functions for threshold calculation, identification, calculation of residuals, filtering, comparison with physical or behavioural models . . . .

The functioning of a failure detection module $MOD_{DP}$ will be specifically described with reference to FIG. 2 in the particular context of detecting engine failures.

The failure detection module $MOD_{DP}$, when detecting a failure affecting a component, a sub-system or the system as a whole, is capable of generating a raw failure message $MSG_{PB}$ comprising raw information $INF_{PB}$ on this failure and a second order confidence level NC2.

The failure detection system conforming to the invention also comprises a data merging module $MOD_{FD}$ capable of receiving:

firstly, messages $MSG_{CAP}$ representing a sensor failure; and secondly, raw failure messages $MSG_{PB}$.

The purpose of the data merging module $MOD_{FD}$ is in particular to confront and integrate multiple raw information items $INF_{PB}$ received in the raw failure messages $MSG_{PB}$ and in the sensor failure messages $MSG_{CAP}$ so as to reduce uncertainty on the resulting information.

The data merging module $MOD_{FD}$ therefore generates consolidated failure messages $MSG_{PC}$ comprising consolidated information $INF_{PC}$ on a failure affecting the system as a whole or a sub-system of the complex system or a component and a third order confidence level.

The consolidated failure messages $MSG_{PC}$ are sent by the data merging module $MOD_{FD}$ to a decision-making module $MOD_{PD}$.

The decision-making module $MOD_{PD}$ is capable of making a decision on the action to be taken in relation to the consolidated information $INF_{PC}$ on the failure, of third order confidence level, obtained for this failure and to the level of seriousness of this failure included in the database BC.

In the example in FIG. 1, the decision-making module $MOD_{PD}$ comprises access means to a database BC formed of a database derived from analysis of failures which may affect the complex system and their associated criticality.

FIG. 2 illustrates an example of a consolidated failure message $MSG_{PC}$ which can be used in a failure detection system according to the invention.

This message comprises five fields, namely:
a DATE field comprising the date of the failure;
an $ID_{SS}$ field comprising an identifier of the sub-system affected by the failure or, when applicable, an identifier of the system if the failure affects the system as a whole;

an identifier $ID_{COMP}$ of the component affected by the failure;

the third order confidence level NC3 obtained by the data merging module $MOD_{FD}$; and the identifier $ID_{FAILURE}$ of this failure.

The data in the first, second and third fields of the consolidated failure message $MSG_{PC}$ form consolidated information $INF_{PC}$ on the failure in the meaning of the invention.

The failure message MSG can be sent in parallel towards a terminal for rapid interpretation of the results.

In the example of embodiment described here the raw failure messages $MSG_{PB}$ have an identical format to the consolidated failure message MSG except that in their fourth fields they comprise a second order confidence level NC2.

FIG. 3 illustrates a recorded database BC.

This recording comprises four fields, namely:
a field $ID_{SS}$ comprising the identifier of a sub-system;
a field $ID_{FAILURE}$ comprising the identifier of a failure;
a field NG comprising a level of seriousness of this failure; and
a field $ID_{ACTION}$ comprising the identifier of a predefined action to be taken in relation to the said failure.

Figure 4:
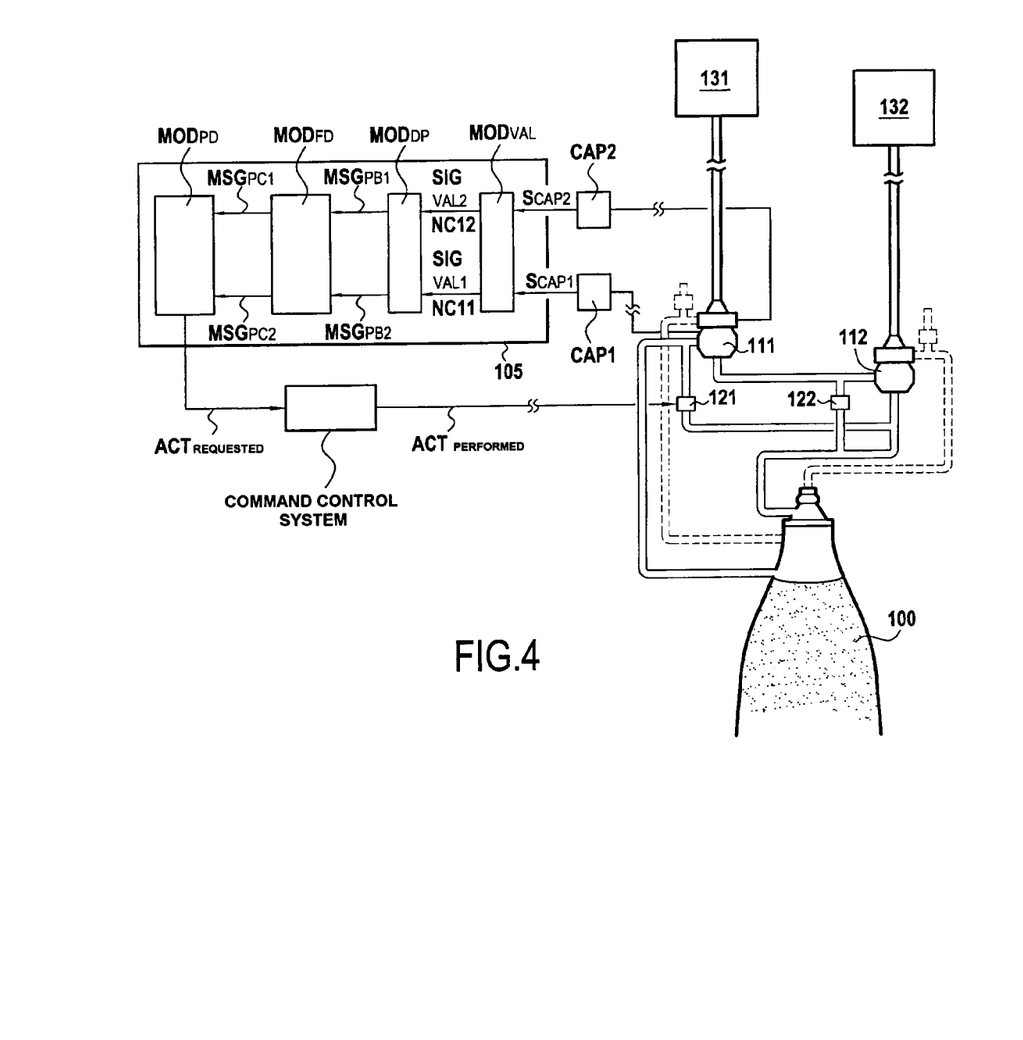
FIG. 4 illustrates an engine conforming to the invention.

FIG. 4 illustrates a rocket engine conforming to the invention.

This engine comprises two propellant tanks referenced 131 and 132 each one upstream of a pump 111, 112. The flow rate of each of these propellants can be regulated by a valve 121, 122. In the embodiment described here this engine comprises:
a first sensor CAP1 capable of measuring the vibrations $V_{111}$ or the acceleration of this pump 111 and of delivering a signal $S_{CAP1}$ representing these vibrations; and
a second sensor CAP2 capable of measuring the pressure $P_{111}$ at the output of the pump 111 and of delivering a signal $S_{CAP2}$ representing this pressure.

Figure 5A:
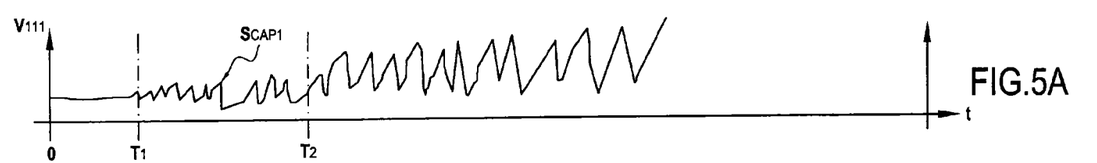
FIGS. 5A and 6A illustrate signals generated by sensors of the engine in FIG. 4.
Figure 6A:
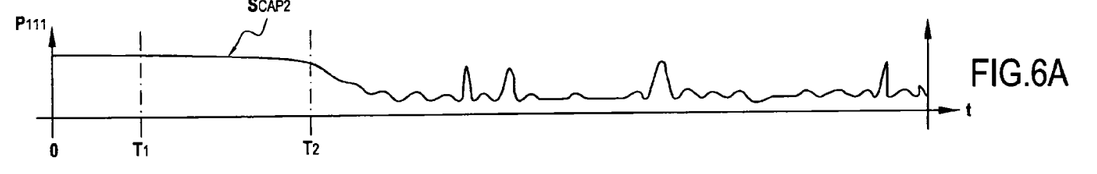

These signals $S_{CAP1}$ and $S_{CAP2}$ are illustrated in FIGS. 5A and 6A.

It will be assumed with reference to these Figures, that the blade of a turbine starts to degrade at a time $T_1$ and this degradation leads to loss of the blade at a time $T_2$, the blade operating normally between times 0 and $T_1$.

Therefore, time $T_1$ can be considered to be the rupture initiation time of the blade.

It will be noted in these diagrams that the pressure $P_{111}$ at the output of the pump 111 drops slightly between times $T_1$ and $T_2$ then drops abruptly on and after time $T_2$ corresponding to loss of the blade.

This engine comprises a failure detection and diagnosis system 105 conforming to the invention.

According to the invention, the signals $S_{CAP1}$ and $S_{CAP2}$ are processed by a validation module $MOD_{VAL}$.

Figure 5B:
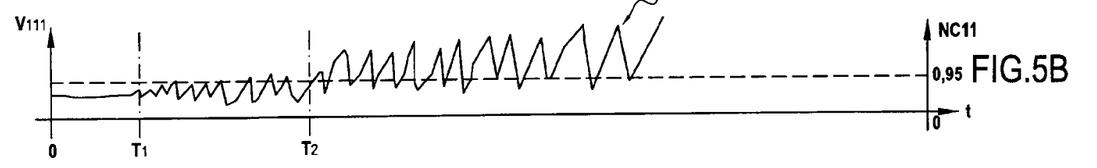
FIGS. 5B and 6B illustrate signals delivered by a validation module of the engine in FIG. 4 and the associated confidence levels.
Figure 6B:
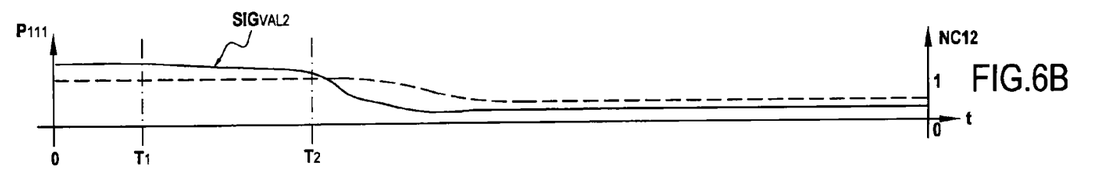

Therefore, according to the invention this validation module delivers two validated signals SIGVAL1 and $SIG_{VAL2}$ illustrated in FIGS. 5B and 6B, each one associated with a first order confidence level respectively NC11, NC12 illustrated in FIGS. 5B and 6B as dotted lines.

In this example, the first order confidence level NC11 of sensor CAP1 remains high i.e. it is 0.95.

On the other hand, the first order confidence level of sensor CAP2 starts to decrease slightly at time $T_2$ then much more abruptly until it reaches a value of substantially 0.45.

In the example described here, there is a drop in the first order confidence level NC12 of sensor CAP2 but nevertheless it is considered in this example that the confidence level of CAP2 remains sufficient to measure the pressure at the output of the pump 111.

Therefore, in this example, the validation module $MOD_{VAL}$ does not generate a sensor failure message $MSG_{CAP}$.

In the example of embodiment described here, the signal $SIG_{VAL1}$ corresponds to $S_{CAP1}$ but the signal $SIG_{VAL2}$ is obtained from the signal $S_{CAP2}$ by eliminating measuring noise.

The signals $SIG_{VAL1}$ and $SIG_{VAL2}$ are received with the first order confidence levels NC11 and NC12 by a failure detection module $MOD_{DP}$.

In the example of embodiment described here, this failure detection module $MOD_{DP}$ is capable of detecting a failure affecting an engine turbine (this turbine being a sub-system in the meaning of the invention).

For this purpose, this module uses two algorithms that are able:
firstly, to analyse the vibrations of a turbine; and
secondly, to analyse the performance of a turbine.

Figure 7:
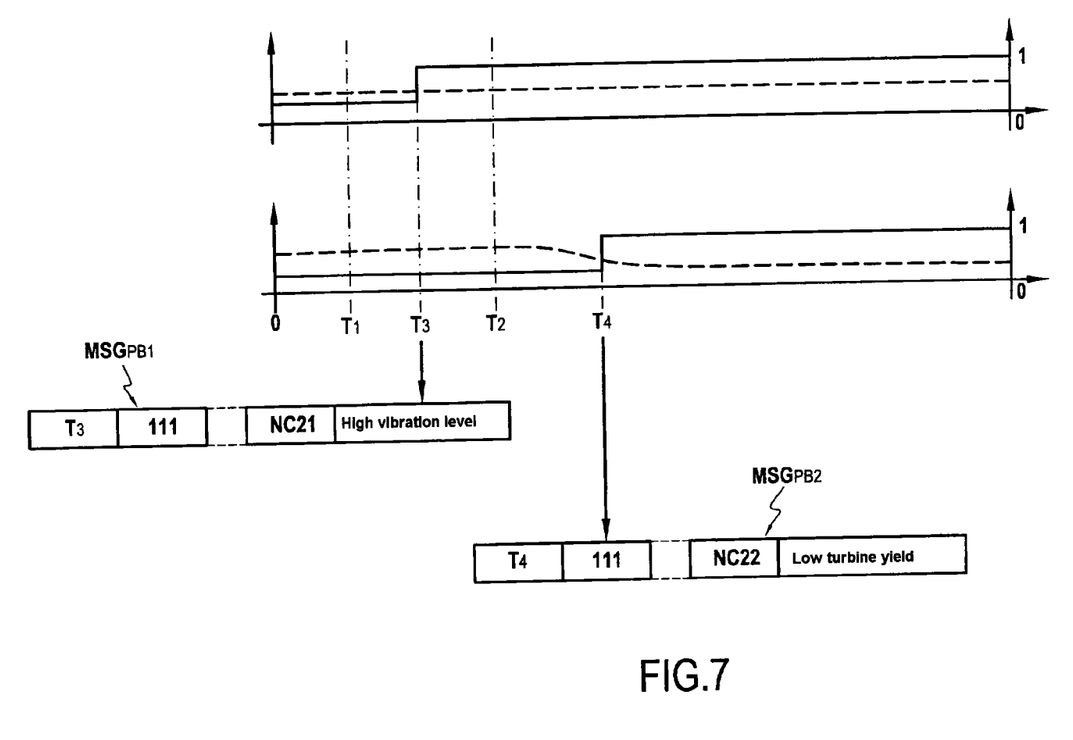
FIG. 7 shows raw failure messages generated by one or more failure detecting modules of the engine in FIG. 4.

In the embodiment described here the failure detection module $MOD_{DP}$, at times $T_3$ and $T_4$ respectively illustrated in FIG. 7, detects:
a first malfunction (<<high turbine vibration level>>) with a second order confidence level NC21 of 0.9; and
a second malfunction (<<low turbine yield>>) with a second order confidence level NC22 of 0.45.

These data items form raw information in the meaning of the invention.

They are sent to a data merging module $MOD_{FD}$, in raw failure messages $MSG_{PB1}$ and $MSG_{PB2}$ at times $T_3$ and $T_4$.

According to the invention, the data merging module $MOD_{FD}$, from the raw failure messages $MSG_{PB1}$ and $MSG_{PB2}$ received at times $T_3$ and $T_4$, generates one or more consolidated failure messages.

In the example of embodiment described here, it will be assumed that the data merging module $MOD_{FD}$ merges the raw information contained in the raw messages $MSG_{PB1}$ and $MSG_{PB2}$ so as respectively to generate at times $T_3$ and $T_4$:
a first consolidated failure message $MSG_{PC1}$ identical to the failure message $MSG_{PB1}$; and
a second consolidated failure message obtained by merging the raw information contained in the two raw failure messages $MSG_{PB1}$ and $MSG_{PB2}$.

The consolidated failure message $MSG_{PC2}$ is illustrated in FIG. 8.

In this example, it will be assumed that the data merging module is capable of detecting the loss of a blade of the turbo-pump 111, with a third order confidence level NC32 of 0.7, the date of the loss of the blade being estimated at time $T_4$.

The consolidated failure message $MSG_{PC1}$ and $MSG_{PC2}$ are sent to a decision-making module $MOD_{PD}$ at times $T_3$ and $T_4$ respectively.

According to the invention, the decision-making module $MOD_{PD}$, on the basis of the two consolidated messages $MSG_{PC1}$ and $MSG_{PC2}$, considers whether action must be taken.

Figure 9:
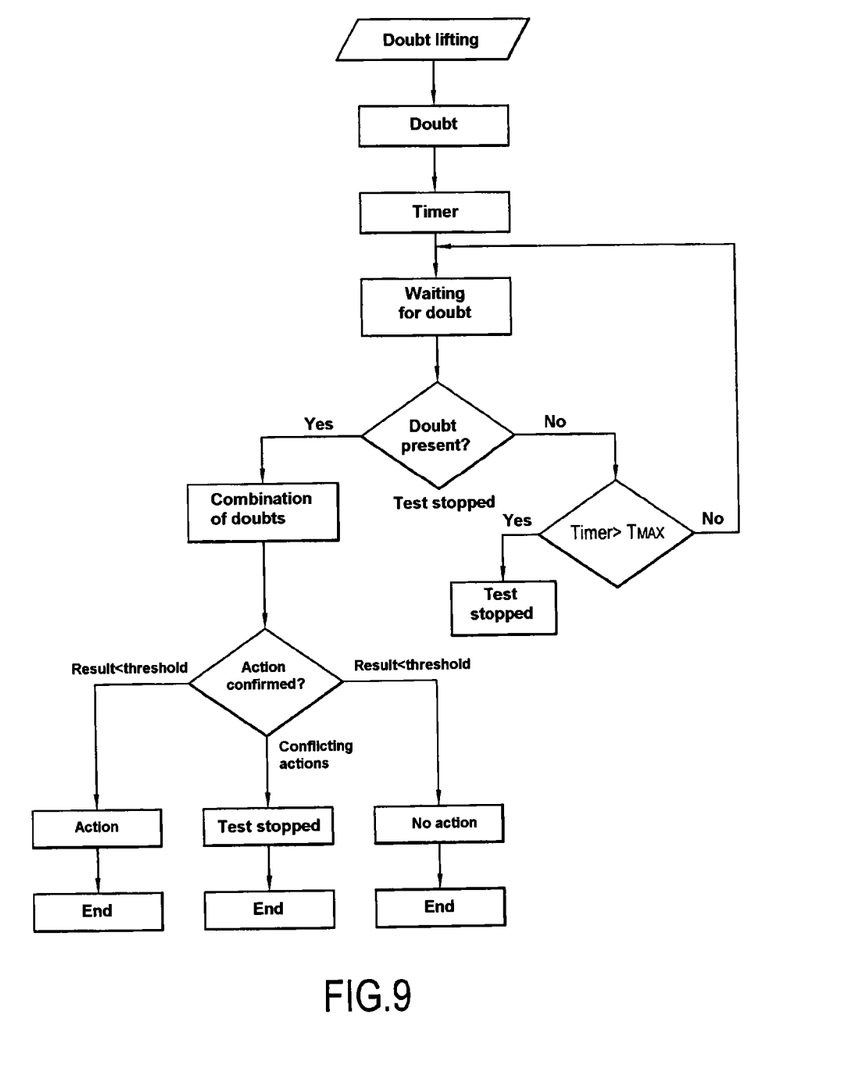
FIG. 9 is a flow chart of an example of functioning which can be used to lift doubt by a decision module in a failure detection system conforming to the invention.

In the example of embodiment described here, on receipt of the first consolidated message $MSG_{PC1}$, the decision-making module $MOD_{PD}$ decides to wait until receipt of another consolidated message before initiating physical action on a member of the engine.

On the other hand, on receipt of the second consolidated message $MSG_{PC2}$, the decision-making module $MOD_{PD}$ takes two actions, namely:
the emitting of a failure message; and
the triggering of a thrust-reducing command to offset the failure.

This second action is materialized in FIG. 4 by the arrow referenced $ACT_{REQUESTED}$; it is performed in this example by a control system which in this example acts on the valve 121 regulating the flow rates of the propellant tanks 131 and 132.

In the example of embodiment described here, the decision-making module $MOD_{PD}$ uses a fuzzy logic technique known to persons skilled in the art and which is detailed below.

According to the invention, the decision made regarding the action to be taken (or not taken) is made in relation to the third level confidence level NC3 and to the level of seriousness NG of the detected failure.

In the embodiment described here, these variables NC3, NG vary over the interval [0; 1].

Figure 10A:
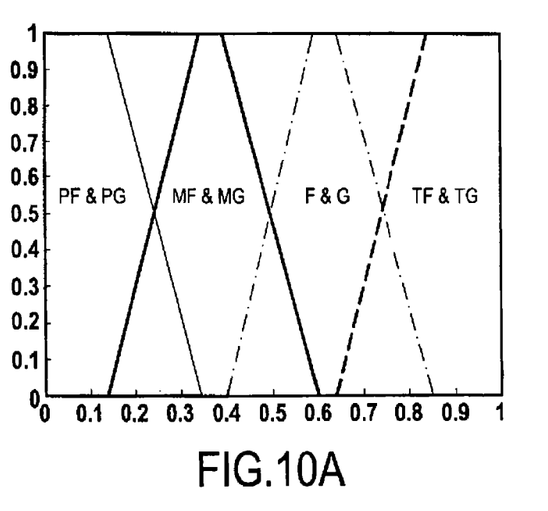
FIGS. 10A and 10B illustrate set-inclusion functions which can be used in a fuzzy logic decision-making module according to one particular embodiment of the invention.
Figure 10B:
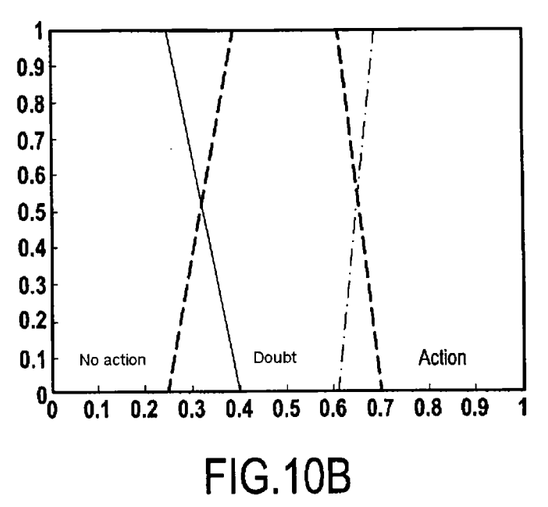

To illustrate an example of embodiment of the invention, it is considered that the decision-making module $MOD_{PD}$ uses the two tables $T_{NC3}$, $T_{NG}$ whose set-inclusion functions are characterized by the following tables and represented in the form of trapezoids in FIGS. 10A and 10B:

TABLE $T_{NC3}$

| Third order confidence level (NC3) | Value |
|---|---|
| Scarcely reliable (PF) | NC3 = [0; 0.15; 0.35] Y = [1; 1; 0] |
| Fairly reliable (MF) | NC3 = [0.15; 0.35; 0.4; 0.6] Y = [0; 1; 1; 0] |
| Reliable (F) | NC3 = [0.4; 0.6; 0.65; 0.85] Y = [0; 1; 1; 0] |
| Very reliable (TF) | NC3 = [0.65; 0.85; 1] Y = [0; 1; 1] |

TABLE $T_{NG}$

| Level of seriousness (NG) | Value |
|---|---|
| Not very serious (PG) | NG = [0; 0.15; 0.35] Y = [1; 1; 0] |
| Fairly serious (MG) | NG = [0.15; 0.35; 0.4; 0.6] Y = [0; 1; 1; 0] |
| Serious (G) | NG = [0.4; 0.6; 0.65; 0.85] Y = [0; 1; 1; 0] |
| Very serious (TG) | NG = [0.65; 0.85; 1] Y = [0; 1; 1] |

The output of the decision-making module $MOD_{PD}$ decides on whether or not to set up corrective action in relation to the diagnosed failure. In the example of embodiment described here, this <<Decision>> variable varies within the same domain as the input data NC3, NG; the set-inclusion function conforms to the breakdown given in following Table $T_{DEC}$:

TABLE $T_{DEC}$

| Decision (DEC) | Value |
|---|---|
| No action (PA) | DEC = [0; 0.26; 0.4] Y = [1; 1; 0] |
| Doubt (D) | DEC = [0.26; 0.4; 0.62; 0.7] Y = [0; 1; 1; 0] |
| Action (A) | DEC = [0.62; 0.7; 1] Y = [0; 1; 1] |

The three tables $T_{NC3}$, $T_{NG}$ et $T_{DEC}$ are stored in memory by the decision-making module $MOD_{PD}$.

Table $T_{REG}$ below summarizes the preceding rules:

TABLE $T_{REG}$

| Decision | | NC3 | | | |
|---|---|---|---|---|---|
| | | PF | MF | F | TF |
| NG | PG | PA | PA | PA | PA |
| | MG | PA | D | A | A |
| | G | D | A | A | A |
| | TG | D | A | A | A |

In the example of embodiment described here, each event within the doubt interval is associated with a value $T_{MAX}$ of maximum residence time in this status; if this value is reached, an order for system stoppage is given for safety reasons.

The invention claimed is:

1. A system for detecting and locating failures in a complex system, comprising:
   at least one sensor (CAP) for delivering a signal ($S_{CAP}$) representing the functioning of a component (COMP) of said complex system;
   at least one module ($MOD_{VAL}$) validating the proper functioning of said at least one sensor (CAP) capable of analysing and comparing said signal ($S_{CAP}$) and of delivering:
      at least one validated signal ($SIG_{VAL}$) associated with a first order confidence level (NC1); or
      a message ($MSG_{CAP}$) representing a failure of said at least one sensor (CAP);
   a failure detection module ($MOD_{DP}$) capable of detecting a failure affecting at least one sub-system (SS1, SS2) or a component (COMP) from said validated signal ($SIG_{VAL}$) and, if it is the case, of generating at least one raw failure message ($MSG_{PB}$) comprising raw information ($INF_{PB}$) on said failure and a second order confidence level (NC2);
   a data merging module ($MOD_{FD}$) which, at least from said raw failure message ($MSG_{PB}$) or from said message ($MSG_{CAP}$) representing a failure of at least one sensor (CAP), is capable of generating a consolidated failure message ($MSG_{PC}$) comprising consolidated information ($INF_{PC}$) on a failure affecting at least one sub-system (SS1, SS2) of said complex system (SC) and a third order confidence level (NC3); and
   a decision-making module ($MOD_{PD}$) capable of obtaining said consolidated failure message ($MSG_{PC}$) from a database and of deciding at least one corrective action in relation to the diagnosed failure that is to be taken in relation to:
      said consolidated information on a failure ($INF_{PC}$);
      said third order confidence level (NC3); and
      a level of seriousness (NG) of said failure.

2. The failure detection and locating system according to claim 1, wherein the action to be taken consists of stopping the complex system, of deactivating, activating or reactivating a component, of modifying its point of functioning or of sending a request to a regulating system.

3. The failure detection and locating system according to claim 1, wherein said decision-making module ($MOD_{PD}$) comprises means for obtaining said level of seriousness (NG) and for identifying said action to be triggered in a database (BC).

4. The failure detection and locating system according to claim 1, wherein said decision-making module comprises means for evaluating said level of seriousness (NG).

5. The failure detection and locating system according to claim 1, wherein said action consists of acting on at least one component of said complex system.

6. The failure detection and locating system according to claim 1, wherein said action consists of waiting for at least one other consolidated failure message ($MSG_{PC}$) to confirm whether said action must or must not be taken.

7. The failure detection and locating system according to claim 1, wherein said decision-making module ($MOD_{PD}$) uses a fuzzy logic technique.

8. A rocket engine, comprising:
   a failure detection and locating system according to claim 1.

\* \* \* \* \*